No. 708,532. Patented Sept. 9, 1902.
R. B. COLTRIN.
MOLD FOR MAKING CEMENT STONE.
(Application filed Apr. 12, 1902.)
(No Model.) 2 Sheets—Sheet 1.

WITNESSES:
Cal. Rhodes.
Marie R. Brown.

INVENTOR:
Robert B. Coltrin
By Chester W. Brown
his atty.

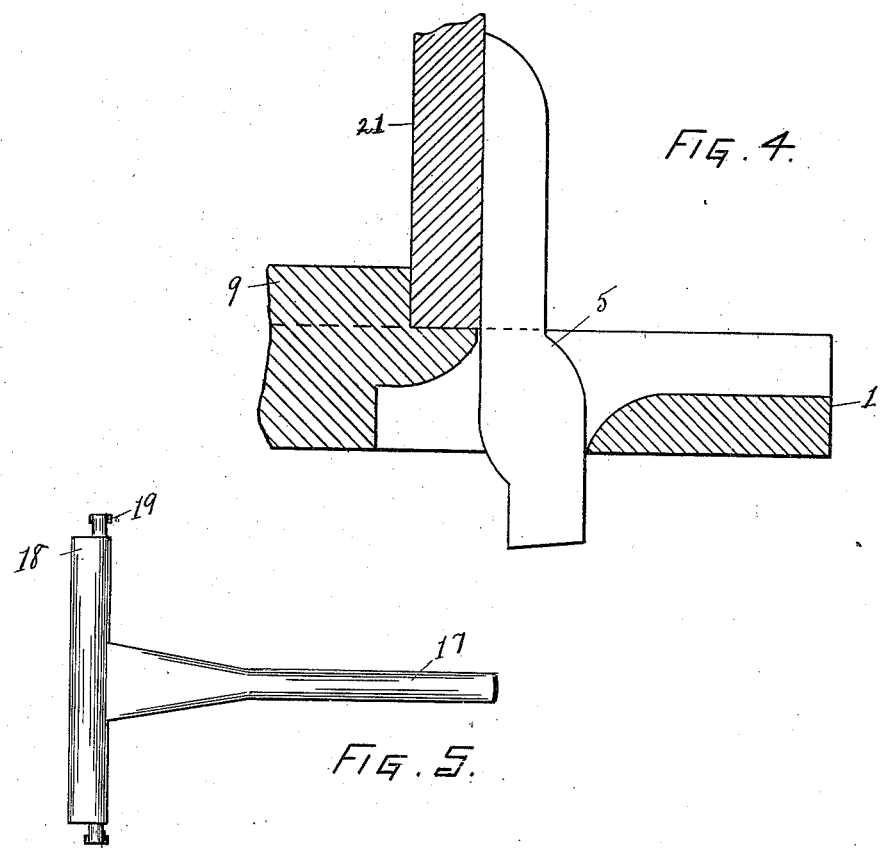

UNITED STATES PATENT OFFICE.

ROBERT B. COLTRIN, OF JACKSON, MICHIGAN.

MOLD FOR MAKING CEMENT STONE.

SPECIFICATION forming part of Letters Patent No. 708,532, dated September 9, 1902.

Application filed April 12, 1902. Serial No. 102,522. (No model.)

*To all whom it may concern:*

Be it known that I, ROBERT B. COLTRIN, a citizen of the United States, residing at the city of Jackson, in the county of Jackson and State of Michigan, have invented a new and useful Mold for Making Cement Stone, of which the following is a specification.

My invention relates to molds for making cement brick or stone for use in building or for other purposes; and my objects are, first, to provide a mold that is light, cheap, and simple in its operation; second, to provide a mold that has interchangeable sides and ends for varying the surface and ends of the manufactured brick; third, to provide a mold for making the brick or stone in sections, other objects and advantages being apparent from the following description. I attain these objects by the construction shown in the accompanying drawings, in which—

Figure 1:
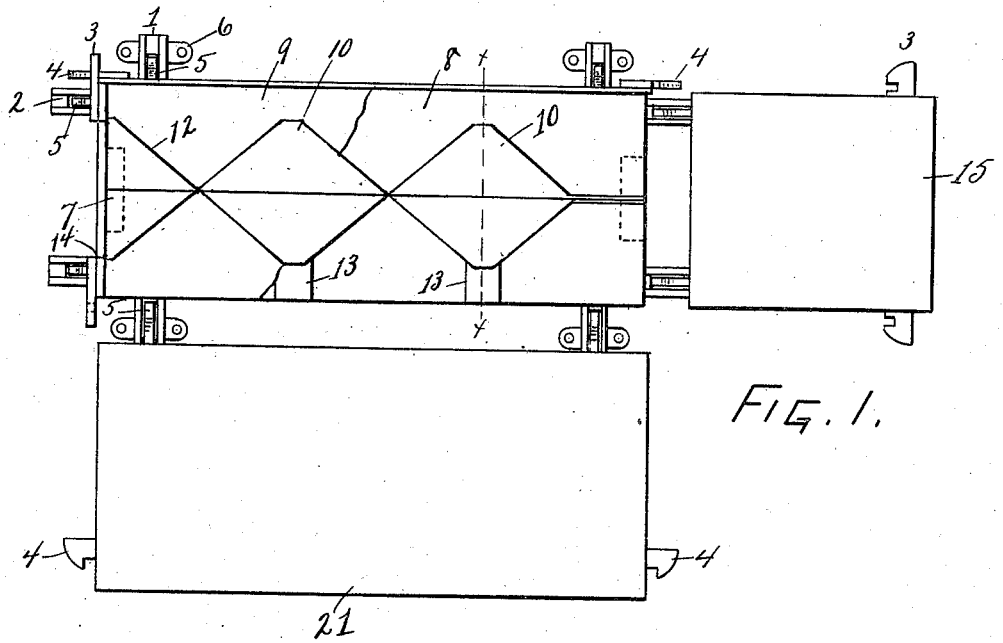
Figure 2:
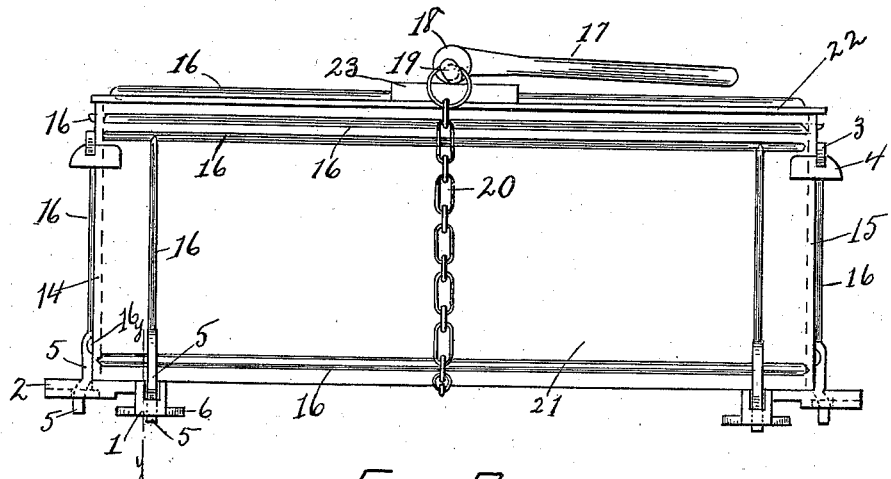

Figure 1 is a top plan view of the mold with the top removed and one end and side dropped down. Fig. 2 is an elevation of the mold with all of the parts assembled ready for use. Fig. 3 is a section view of the base, auxiliary bottom, and cores on the line $x\ x$ of Fig. 1. Fig. 4 is a detail view, partly in section on the line $y\ y$ of Fig. 2, showing the construction and shape of the detachable hinge-joint connecting the sides and base. Fig. 5 is a plan view of the lever and eccentric by means of which pressure is applied to said mold when desired.

Similar figures of reference refer to similar parts throughout the several views.

The main body portion of my mold consists of a base 9, of substantially a rectangular shape, having indentations 7 at the ends to supply hand-places to permit the operation of the auxiliary bottom, hereinafter mentioned, in the removal of the molded stone. The said base also has the projections 1 1 1 1 extending sidewise therefrom and having openings therein to receive the tongues 5 5 of the side pieces, forming a detachable hinge-joint. The portions 6 6, attached to the sides of said ears 1, form feet upon which the mold stands, and holes may be made therein to receive screws or bolts for securing said mold to a suitable bench or other support. On the ends the said base has the ears 2 2 2 2, substantially like the ears 1, to receive the tongues on the end pieces. Superimposed upon said base I employ the auxiliary bottom 8, which is shown with the lower portion broken away at one end to show the base thereunderneath. This auxiliary bottom has the cores 10 mounted thereon either permanently or detachably, as desired. For convenience in handling the block to be molded and for facility in removing said block from the mold I have divided the said cores and the said auxiliary bottom longitudinally, as shown in Fig. 1, the core, as shown, dividing the molded block into two similar parts. The right-hand end of said mold is shown as forming a solid end without the diamond-shaped opening therein, as formed in the left-hand end. This is specially desirable for forming the corner-block, which must have an end face. It is apparent that the said end 15 may be replaced with an end having any other shape of a design thereon, if preferred, and that in place of molding the right-hand end of said block without opening therein, if desired, the cores at the right-hand end may be made similar to the left-hand end and form one-half of another diamond core to supplement the left-hand end in forming a complete diamond opening at the conjunction of two blocks when placed end to end. It will be apparent that cores of any desired shape may be used in lieu of the ones shown and that, if desired, openings may be left between said diamond-shaped cores for the cement to enter and unite the opposite sides of said molded stone into one block, or, if desired, the cores may be removed entirely, and the molded block will then be solid, without openings of any kind. At the places 13 13 I have shown raised portions upon said auxiliary bottom which are wedge-shaped in cross-section, as shown in Fig. 3, which leave openings in the sides of the molded block, into which wooden wedges may be driven to receive nails for supporting woodwork when desired. These raised portions may be placed at such portions of said bottom as desired and may be made detachable to permit of the substitution of other or different shaped portions when desired. The sides and ends of said mold I have formed of detachably-hinged doors 21 and 15 to facilitate the interchange of different-shaped sides and to facilitate the removal of the molded block. These said doors are connected to the base at the bottom by the hinge-joint formed by inserting the tongues 5 5 thereon into the slots in the ears 1 1 on said base. By this construction the doors forming said sides and ends are held firmly against the bottom at the time of molding, and yet are easily and quickly opened upon their hinges, as shown at Fig. 1, to permit the removal of the molded block. The said doors are also readily interchangeable, as they are disconnected from the base by simply lifting the door bodily upward until the tongue is above the ear in which it had been engaged, and the next door is inserted by lowering it until the tongues thereon engage the said ears. By this construction all doors having any designs thereon desired are readily interchangeable for molding either one block or more, as desired. At the upper portion of the doors I have formed projections 3 and 4. The portions 4 have notches in their upper side, and the portions 3 have notches in their under side to engage with the notches on said 4, and lock the upper corners of said doors firmly together thereby. I have made these corner-pieces firmly attached to said doors; but it is apparent that one of them might be mounted upon a pivot similar to the customary form of latch, but would be more liable to become broken or detached. The top plate 22 is constructed of a rectangular shape to conform to the form of the mold and has the ribs 16 thereon to stiffen it. At the middle portion is a comparatively flat raised portion, and upon this rests the roller 18 of the compression-lever 17. This roller extends the width of said mold and has the ears 19 at either end thereof and which are eccentric to the said roller or at one side of the center of said roller. About the ends of the said roller is passed the chain 20, which is also passed about the said mold, the lugs at the end of the said ears holding the said chain from slipping off therefrom. To compress the said block, the end of the lever 17 is then raised upward and the roller 18 is rolled over until the ears are raised a sufficient distance to tighten said chain and compress the said top plate to the extent desired. The parts marked 16 wherever shown are ribs upon the said mold to stiffen the material and prevent springing or giving of the parts under pressure.

In the operation of said mold the sides and ends are attached to the base, as described, and the auxiliary bottom, with the cores desired, are placed within said mold. The side and end doors are then raised to the vertical position and locked at the corners by raising the end doors until the latch thereon passes over the end of the catch upon the side doors and passes into the notch formed therein. The cement prepared is then placed in said mold, the same upon both sides, if desired, or cement of different consistency placed in the side to form the front when preferred, and the cement is then rammed down until it is packed as hard as desired. If it is desired to exert a further pressure thereon, the top plate is placed upon said mold and the chain passed about the mold and hooked over the ends of the roller. By means of the said lever the proper pressure is then applied to said block. After the said block has been permitted to set as long as desired the top is removed and the end and side doors are opened. At this point a board of proper size is placed against the outer side of the portion of the block desired to be removed, and the portion of the core adjacent to said block is pushed outward at the top and turned until the block rests upon the said board. The core and auxiliary bottom may then be removed from said block and placed in the mold for the next operation, while the block molded is carried away to set. By this construction it is apparent that the cores may be made at right angles to the bottom without providing for any draw, as is customary in making cores, and also that in said core may be made any design or configuration desired for ornamentation when the blocks are to be laid with this side outermost, and the core may be removed as easily from said block as though there were no configuration thereon. It will also be seen that the blocks when removed from the mold are much lighter to handle than they would be if molded in one undivided block. It will further be seen that it greatly facilitates the removal of the said blocks, and when the block is turned upon its side it is substantially pyramidal in shape and there is less danger of the sides and corners crumbling or breaking before the block is set, and at the same time the blocks may be laid in a wall and tied properly to form a hollow wall and present many advantages in construction not securable from rectangular-shaped blocks.

Having thus described my invention, what I claim, and desire to secure by Letters Patent, is the following:

1. The combination with a mold, of a two-part member forming a series of cores, the core at one end of the series being closed and the core at the opposite end thereof being open.

2. A series of cores for molding-machines constructed and arranged in sections and adapted when placed together to form the series of cores, the core at one end of the series having a closed end and the core at the opposite end of the series having an open end.

3. A series of cores for molding-machines constructed and arranged in sections and adapted when placed together to form the series of cores, the core at one end of the series being open.

4. In a mold, a base having sides and ends hinged thereto, said sides and ends being locked together, an auxiliary sectional bottom arranged above said base, sectional cores arranged upon said bottom, a top plate, and means for pressing said top plate downward with relation to said sides and ends.

5. In a mold, a base having sides and ends detachably secured thereto, means connected with the sides and the ends for fastening them in a vertical position, an auxiliary bottom, said bottom being split throughout its entire length, sectional cores disposed upon said bottom, a top plate, and means for pressing the top plate downward with relation to said sides and ends.

6. In a cement-mold, a base having ears thereon; detachable sides and ends having tongues for engagement with said ears; a sectional auxiliary bottom, and sectional cores mounted thereon.

7. A series of cores for molding-machines constructed and arranged in sections and adapted when placed together to form the series of cores one core of the series having an open portion.

8. In a cement-mold, a base; detachably-hinged sides and ends; a top plate; a roller having ears at either end eccentric to said roller; a chain about said mold and its ends in engagement with said ears; and an arm for turning said roller to tighten said chain and compress said mold.

9. In a cement-mold for plastic material, a base; a removable auxiliary bottom superimposed thereupon consisting of two or more sections; sectional cores mounted upon the auxiliary bottom and removable therewith and detachably-hinged sides and ends.

10. In a mold, a base, sides and ends detachably secured to said base, a top plate, a lever having a roller provided with ears at its ends, and a chain having connection with the ears of said roller whereby the top plate may be pressed downward with relation to the sides and ends when the lever is raised.

11. A mold for plastic material, consisting of a base having ears thereon; each of said ears having a rectangularly-shaped opening therein; curved portions upon said ears adjacent to said openings; sides and ends having downwardly-directed projections conforming in cross-section to said rectangularly-shaped openings in said ears, with curved surfaces upon said projections adjacent to said rectangular-shaped portion, and straight portions to roll upon the curved portions of the ears in raising and lowering the said sides and ends in their operation.

12. The combination with a mold having detachably-hinged sides and ends, of an auxiliary bottom consisting of two sections, and sectional cores mounted thereon dividing the mold into two separate and distinct molds.

13. The combination with a mold, of a two-part member forming a series of cores.

14. In a mold, a base, sides and ends detachably secured to said base, an auxiliary bottom having raised portions, cores arranged upon said bottom, a top plate, and means for pressing the top plate downward with relation to the sides and ends.

15. In a mold, a base, sides and ends detachably secured to the base, an auxiliary sectional bottom having raised portions in its upper surface, sectional cores arranged upon said bottom, a top plate, and means for pressing the top plate downward with relation to the said sides and ends.

16. In a mold, a base, sides and ends detachably secured to the base, an auxiliary bottom split throughout its entire length, the split members of said bottom having raised portions in their upper faces, sectional cores arranged upon the said bottom, a top plate, and means for pressing the top plate downward with relation to the said sides and ends.

17. In a mold, a base, sides and ends detachably secured to the base, an auxiliary bottom split throughout its entire length, and a core formed of two parts whereby part of the core may be removed from the mold simultaneously with one split portion of the auxiliary bottom.

18. In a mold, a base, sides and ends detachably secured to the base, an auxiliary bottom split throughout its entire length, a core formed of two parts whereby one part of the core may be removed independently of its companion part, and a top plate adapted to be pressed downward upon the said sides and ends.

19. In a mold, the combination with a sectional auxiliary bottom of a sectional core, the said bottom and the core being constructed and arranged whereby a section of the bottom may be removed with a section of the core independently of the other sections of the bottom and the core.

20. A series of cores for molding-machines constructed and arranged in sections and adapted when placed together to form the series of cores.

21. A series of cores for molding-machines constructed and arranged in sections and adapted when placed together to form a series of compartments independent one of the other.

In witness whereof I have hereunto set my hand this 10th day of April, 1902.

ROBERT B. COLTRIN.

Witnesses:
CHESTER W. BROWN,
L. R. KNOWLES.